INVENTOR.
JIRI HRDINA

May 7, 1968 J. HRDINA 3,381,856
DEVICE FOR THE REPETITIVE METERING OF EXACT
QUANTITIES OF LIQUIDS
Filed March 29, 1967 4 Sheets-Sheet 3

INVENTOR.
JIRI HRDINA
BY
Attorney

May 7, 1968

J. HRDINA 3,381,856

DEVICE FOR THE REPETITIVE METERING OF EXACT
QUANTITIES OF LIQUIDS

Filed March 29, 1967

INVENTOR.
JIRI HRDINA
BY
Attorney

United States Patent Office 3,381,856
Patented May 7, 1968

3,381,856
DEVICE FOR THE REPETITIVE METERING OF EXACT QUANTITIES OF LIQUIDS
Jiri Hrdina, Prague, Czechoslovakia, assignor to Ceskoslovenska akademie ved, Prague, Czechoslovakia
Filed Mar. 29, 1967, Ser. No. 626,815
6 Claims. (Cl. 222—48)

ABSTRACT OF THE DISCLOSURE

In a device for repetitively dispensing predetermined amounts of liquid which are first drawn from a source of supply into the cylinder of a syringe-like apparatus and then expelled by the movement of a piston, an actuating mechanism for the piston which comprises a pivoting double arm lever having one arm connected to said piston and the other arm to an eccentric which is set such that the piston comes gradually to a stop within the cylinder both at the end of the suction stroke and at the end of the expulsion stroke.

Background of invention

In various laboratories, particularly in sequential or assembly line type of operations, it is essential to use a device that makes possible the sequential or repetitive metering of predetermined quantities of liquids with a minimum number of manual movements, so that the operator's hands can be free for exchanging the vessels. Such devices eliminate the need for using ordinary pipettes which first require suction by mouth and then closing the upper end of the pipette with a finger. This maneuver often must be repeated a number of times in transferring the liquid from one vessel to another. This method is not suited to modern laboratories, not only because of its complexity and inefficiency, but also because of the likelihood of human error and in many cases also because of hygienic considerations. For these reasons various types of semiautomatic or fully automatic metering or dispensing devices have previously been developed. However, their performance is not fully satisfactory either, or they are too complicated and expensive.

To simplify the manufacture of such devices and to increase their resistance to corrosion, for the most part a combination of injection syringe with an adequately tight piston has been used as the work cylinder, with automatic glass valves. The advantages of this combination are, however, at least partially counterbalanced by lessened accuracy and reduced possibility of checking errors, etc. The reasons for these shortcomings are various. For instance, if the piston moves at a certain speed within the limits determined by the stops, when the appropriate stop is reached and the motion of the piston suddenly stops, this jars the fluid which at that moment was flowing at a certain quantity through the valve system. The liquid in the line has a certain kinetic energy and flows at this moment directly through the two valves until the rate of flow reaches zero. The amount which flows as the result of this action and is dispensed, therefore depends to a significant degree upon the rate of motion or upon the impacts against the stops that limit the motion of the piston, and this entails an unwanted reduction in the accuracy of volume measurement. Moreover, in view of this relationship, a preliminary calibration is not an exact means for suppressing this error, because in a manual operation it is difficult to work always with the same piston speed or with the application of the same pressure to the hand lever or pedal by which the piston is set in motion.

Summary of the invention

The invention is based on the recognition that this defect can be avoided if the metering device has means assuring that the motion of the piston in the course of metering begins from a rate of zero and after reaching the maximum rate it again drops to zero before reaching the end position. This must be attained on the suction stroke as well as on the pressure stroke.

Various solutions of this problem are possible, but most of these only at the price of excessive complexity which is not acceptable in the case of simple laboratory metering devices. In contrast to such complex devices, the device of the present invention meets all requirements. According to this invention a substantially harmonic piston motion is achieved with both hand and foot operation, even when the actuating element is acted upon with a pressure that gives rise to an arbitrary rate of motion of the said actuating element. This is attained according to the invention by connecting a variable mechanical transmission which insures that a zero value is reached by the transmission at the stopping points. This permits varying the total dosage from zero to a maximum value in a simple manner.

Brief descritpion of drawing

FIGS. 1 to 7 of the drawing shown examples of practical embodiments of the invention.

Detailed description of specific embodiments

Figure 1:
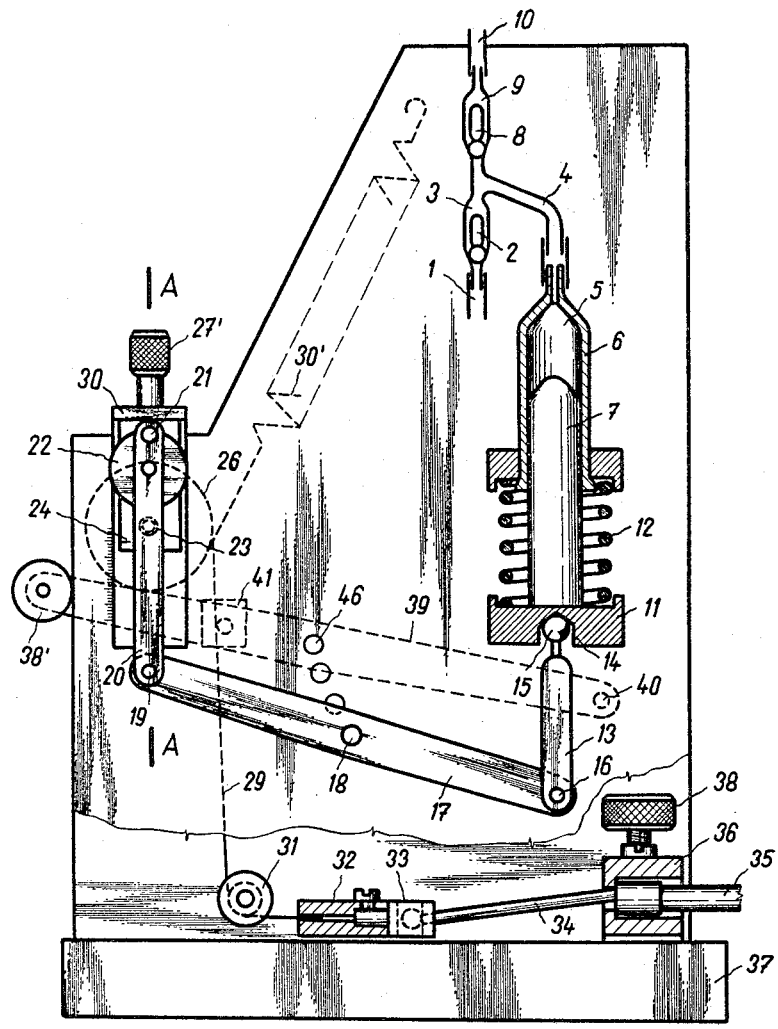
FIG. 1 is an elevation and FIG. 2 is a plan view of one such apparatus as a whole.
Figure 3:
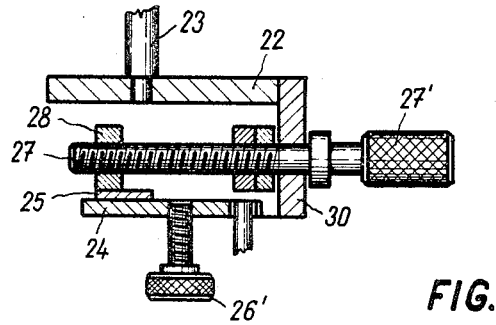
FIG. 3 shows on a larger scale the section along A—A of FIG. 1.

Referring to FIG. 1, the liquid is delivered in exactly measured amounts from suction passage 1 via the valve distributor with automatic valves. During the suction stroke in which piston 7 moves downward the liquid is sucked into work chamber 5 through suction valve 2 which is arranged in the chamber 3 that is connected to work chamber 5 via line 4. During the upstroke of piston 7 the liquid flows out of chamber 5 through line 4 via pressure valve 8 into chamber 9 and pressure line 10. At the lower end of piston 7 there is a body 11 which is pressed downward by the pressure of spring 12 while its motion is determined by an external moving mechanism. Rod 13 of the latter is supported or seated in the hole 14 in body 11 by means of its spherical end 15 and is connected by means of a link 16 with the double lever that pivots on pin 18. By means of pin 19, the other end of lever 17 is connected with crank 20 which bears eccentric crank pin 21 at its upper end. The eccentricity of this pin with reference to shaft 23 can be continuously changed and fixed in any desired position by an adjusting or locking device. This device consists of base body 22 fixed on shaft 23. Crank pin 21 is fixed in the support plate 24, whereby said plate 24 together with crank pin 21 is fixed against body 22 by the pressure of plate 25 with slanted sides that move in the corresponding inner surfaces of body 22. Crank pin 21 passes without binding through plate 25, and the position of plate 25 in relation to plate 24 is fixed and tightened by a bolt 26'. Plate 24 and body 22 support a scale and index, whereby the eccentricity of crank pin 21 can be set reproducibly, particularly if the main scale is provided with a vernier. The fine support motion is effected by means of a bolt 27 which engages guide nut 28 fixed to plate 25 or 24. In this way guide bolt 27 can be turned by means of a knob 27' and provided with a scale which forms a micrometer scale together with the scale on the support. Bolt 27 is secured against axial movement by being seated in bearing 30.

The whole support eccentric turns with shaft 23 which passes through the long bearing 24′, the bearing being fixed in base plate 25 of the metering device. On the other side of shaft 23, disk 26 is fixed which has a peripheral groove of the indicated profile. A groove passes radially across disk 26 so that said disk can be fixed with bolt 28 to shaft 23 by clamping action. In the peripheral groove of disk 26 there is cable 29, one end of which is tensioned by spring 30′ which tends to cause the shaft to turn counterclockwise. The other end of the cable 29 is carried over roller 31 and held by means of coupling element 32 with which the second part 33 of the coupling engages. Said coupling part 33 is connected with the upper end of the Bowden cable 34 whose sheath 35 is held by retaining body 36 and which is tightened toward the base plate 37 of the metering apparatus by means of bolt 38. After loosening said bolt 38 and releasing both parts 33 and 32 of the coupling, the foot pedal can be disconnected. Bowden cable 34 and its sheath 35 are connected to a foot pedal of any construction, which upon depression causes the drawing in of the upper part of Bowden cable 34 and therewith a movement toward the right on the part of roller 26. If the metering apparatus is hand operated, this is done by means of hand key 38′ which is fixed on the left end of pressure lever 39, said lever being pivotable about pin 40. The connecting element 41 is fixed on lever 39, cable 29 being fixed in said element 41. Pressure by a finger on key 38′ has the same effect as depression of the foot pedal.

Figure 2:
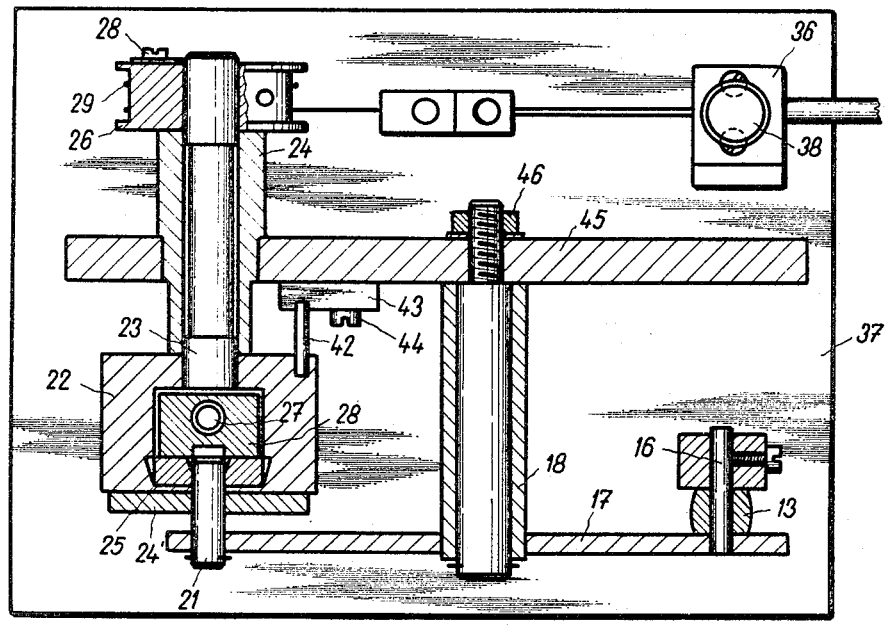

The movement of roll or disk 26 and with it also of shaft 23 together with the eccentric is limited to one-half rotation or to the span indicated by dotted lines, in which the ratio of translation between the cable and the piston is equal to zero, whereby the limitation (FIG. 2) is achieved by means of stop pins 42. Stop pins 42 establish the required limitation by contact with adjustable stop 43 which is fixed by bolt 44 to base plate 45.

By reduction of the lift as a result of reduction of the eccentricity of crank pin 21 to zero, the range of motion of piston 7 is reduced to zero, whereby piston 7 assumes its mid position, where the free work chamber 5 above it has the magnitude of half the total volume. This circumstance can sometimes be disadvantageous, particularly when there is to be a rapid purging of the whole device, that is to say if one liquid must be replaced by another. This disadvantage can be limited, e.g., by setting in different positions the pin 18 on which double lever 17 pivots, for instance by loosening nut 46 (FIG. 2) which fastens it to base plate 45 and resetting it in another position. The pin is either switched from one to another of several alternative openings 46 drilled in plate 45, or the adjustment can be made by moving the pin to a proper position in a slot in plate 45 (not shown in FIG. 1). It is advantageous if this slot or row of holes 46 is arranged in an arc or if by means of a link 15 it approaches a position near the uppermost position of piston 7.

Figure 4:
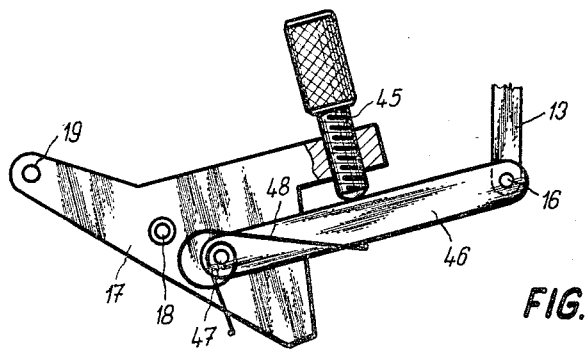
FIGS. 4 to 7 show details of various possible embodiments of the apparatus.

In FIG. 4 a modified embodiment is schematically shown which also can be used to bring about a reduction of the undesired large chamber 5 above piston 7 in certain cases. In these cases the eccentricity is reduced or brought to a zero value, whereby it is also ensured that no undesired pressure will be exerted on piston 7 or by means of piston 7 on the upper end of work cylinder 6 even in the event of an oversight, and also that with repeated increases in the eccentricity it is necessary to move pin 18 into the original position of FIG. 1 which makes possible a full stroke of the piston through the entire useful volume of the injection syringe or work cylinder 6. Lever 17 in the form indicated in FIG. 4 is provided with a set screw 45 which limits the swinging out of lever 46 which is connected with lever 17 by an additional link 47 and which supports pin 16 at its extremity, by means of which arrangement it is connected to piston rod 13. Lever 46 is pressed against set screw 45 by spring 48. By turning screw 45, an upward movement of piston rod 13 and therewith of piston 7 can be effected even in the inoperative position of lever 17. Here, however, if piston 7 is seated on the upper end of cylinder 6, no excessive pressure develops, since through the merely elastic application of lever 46 on set screw 45, the pressure exerted on piston 7 will only be reduced to the value established by the reduced force of the elastic or resilient action of spring 48.

Figure 5:
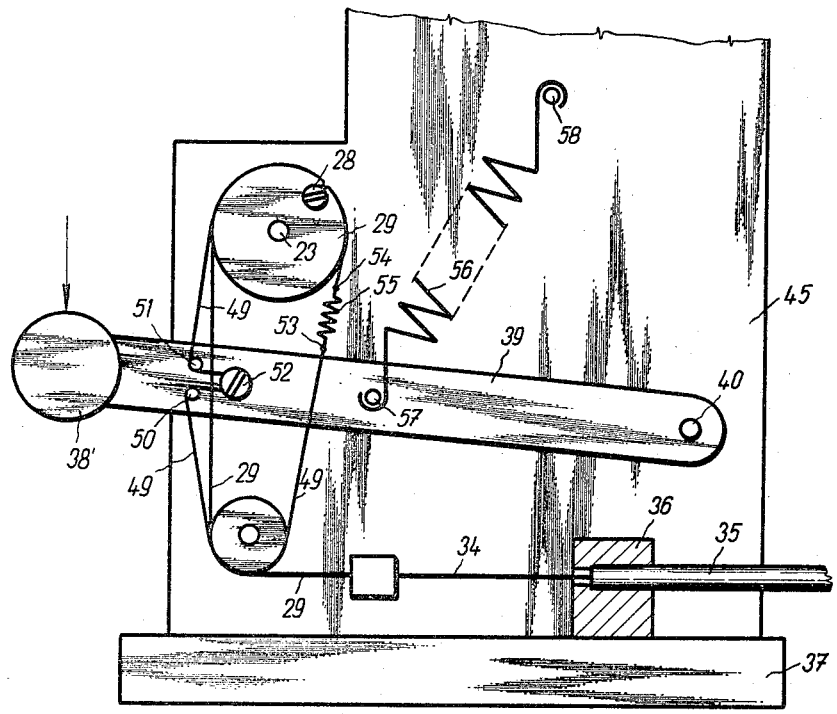

FIG. 5 shows an example of the structure of the transmission from hand lever 39 with pressure key 38′, the lever being pivotable about pin 40, to roll 29. At bolt 28, not only is cord 29′ attached to Bowden cable 34 as in the preceding case, but there is an additional cord 49 which instead of cord 29 is fastened to lever 39 by bolts 50, 51 and clamping screw 52. Since with movement along the arc with midpoint in the axis of pin 40, the length of cord 49 would change if this element were to engage the entire periphery of rolls 29 and 31, a stiff spring 55 is introduced between its ends 53, 54, which spring equalizes the length of encirclement. This spring 55 is substantially stronger than spring 56 which is anchored at pin 57 to lever 39, and by means of pin 58 to the vertical plate 45. Spring 56 replaces spring 30′ of FIG. 1.

Figure 6:
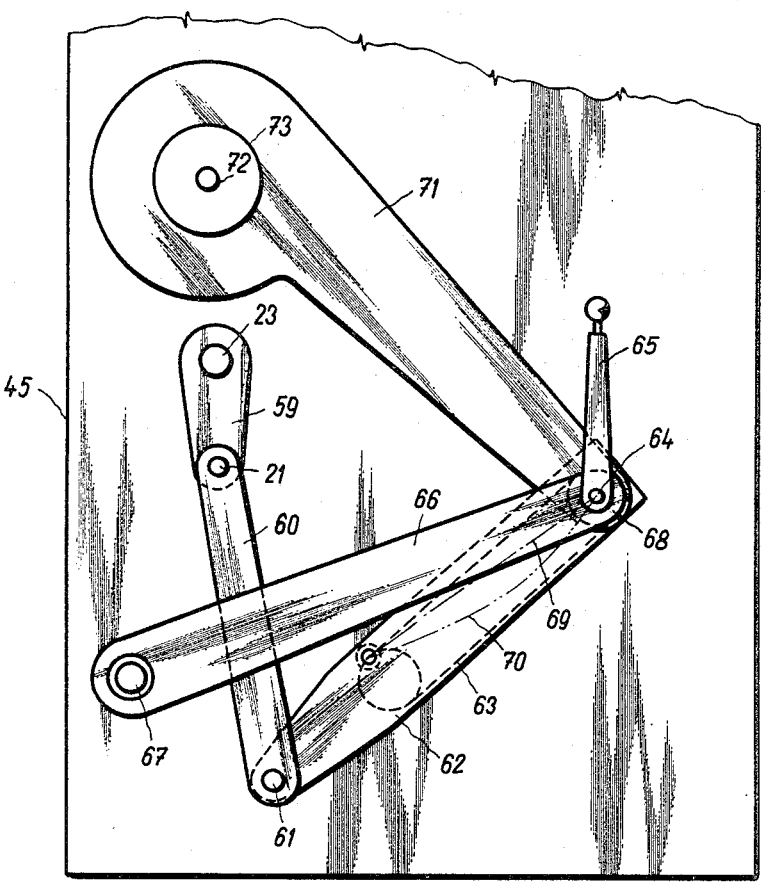

FIG. 6 shows another embodiment of the device of the invention. In this case the crank pin 21 on arm 59, which arm is seated on shaft 23, has a fixed eccentricity and is connected with pin 61 by rod 60. Pin 61 is fixed on one end of lever 62. This lever is provided with a slot 63, and at the other end it is connected by pin 64 with rod 65 and also with arm 66 which is pivotable about 67. Said pin 67 is fixed to base plate 45. Slot 63 of lever 62 is engaged by movable pin 68, which advantageously can be a ball bearing. Said pin or bearing 68 can be set along the straight or arcuate path 69 (dashed lines) or 70 in different positions. Pin 68 or the bearing that replaces it can be fixed in a support (not illustrated) by means of which it can be fixed in various positions on plate 45 along straight path 69, or it can be fixed to the end of lever 71 that is pivotable about pin 72. Pin 72 is also fixed to base plate 45 in this case. Upon rotation of this lever after loosening and renewed fixation by means of bolt 73, the pin or bearing 69 can be fixed in various locations on the arcuate path 69 with the center on the axis of pin 72.

If the bearing or pin 68 is in its uppermost position as in FIG. 6, where the axis of this pin coincides with that of pin 64, rod 65 is motionless, even if crank 59 and rod 60 connected therewith moves between the two dead centers. If, however, the bearing or pin is shifted with movement of the crank along path 69 or 70 into any other position, pin 64 begins to move and with it rod 65 and the pump piston, corresponding to the arm lengths of the double lever which is pivoted on pin 68. In this way a continuously changing stroke of the pump can be created even with unaltered eccentricity of crank pin 21. Since in the above described mechanism the translation in the marginal positions reaches zero, even a slight amount of force in the near zero resistance moment causes a great angular acceleration just in the positions near the stops. For this reason it could be advantageous to ensure that the piston velocity in the marginal regions will gradually be reduced to zero, whereby as complement to the entire apparatus a mechanism can be provided which develops a sufficient gradually increasing supplementary moment in the marginal positions, which together with the other moments produces a resultant moment. This increases in the areas approaching the two stops in such a way that an increasing hand or foot pressure must be applied on the lever or pedal. In this way the speed of piston 7 and thereby also that of the liquid in the passages or conduits will be reduced to zero or to a very low value in the ranges before the stops are reached. This is necessary to avoid the occurrence of undesired dynamic phenomena where the kinetic energy of the moving liquid column effects its flow through the valves independently of the piston speed.

Figure 7:
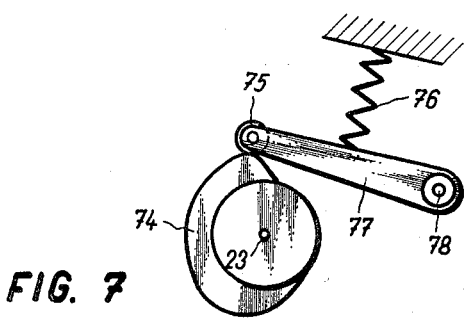

In FIG. 7 a camming device is shown as an example of an embodiment for achieving a supplementary moment for the purpose described above. A cam 74 is fixed on shaft 23 which supports the cam or crank. A roll 75 engages this cam, the said roll being fixed on the end of arm 77 which is pivotable about fixed pin 78. This arm and with it roll 75 are applied to the periphery of cam 74 by means of compression spring 76. The form of the said cam is such that by its engagement with roll 75 a supplementary moment develops which after addition to the other moments acting upon shaft 23 has the effect of increasing the total moment at the stops on either side in such a way that it must be overcome by the gradually increasing force acting on the hand or foot lever.

I claim:

1. In a device for repetitively metering exact amounts of liquid with an automatically operating valved intake and exhaust system, in which the metered quantity of liquid is drawn into a syringe-like cylinder via a suction valve by suction movement of a reciprocating piston within said cylinder and expelled by opposite movement of said piston, an improved actuating mechanism with a variable rate of translation which comprises:
   a pivoting double arm lever having one arm connected with a rotatably mounted eccentric and the other arm connected to the piston,
   means for actuating said eccentric which actuating means comprises a cord means having one end attached to a tension spring means and the other end to a driving means adapted to apply force at intervals to said cord in opposition to said tension spring, and
   stop means adapted to limit the rotation of the eccentric in such a way that the piston in the cylinder moves gradually from a full stop at a preselected point at one end of the cylinder to a full stop at a preselected point at the opposite end of the cylinder while reaching a maximum speed in between.

2. Device as in claim 1 further characterized in that a variable transmission comprising a crank mechanism with variable eccentricity is provided between said driving means and said piston.

3. Device as in claim 1 wherein the eccentric comprises a crank pin for securing the eccentric to a support and a scale and a set screw for securing the said crank pin in a set position.

4. Device as in claim 3 further characterized in that the support of the eccentric contains a guide bolt with scale, engaging with a nut of the support.

5. Device as in claim 1 wherein said double lever pivots about an adjustable pin.

6. Device as in claim 3 which further comprises:
   a cam which turns with the crank pin of the eccentric, and
   a roll engaging said cam and a pressure spring acting on said cam, whereby the cam is provided with slanting travel surfaces that rise toward the said stops ahead of the stop position.

References Cited

UNITED STATES PATENTS

| | | | |
|---|---|---|---|
| 1,736,392 | 11/1929 | Coss et al. | 222—179 X |
| 2,436,030 | 2/1948 | Abbott | 222—179 |
| 3,089,618 | 5/1963 | Forsyth | 222—60 |

ROBERT B. REEVES, *Primary Examiner.*

H. S. LANE, *Assistant Examiner.*